L. WRIGHT.
TWINE HOLDER.
APPLICATION FILED JULY 29, 1919. RENEWED APR. 7, 1921.
1,378,752.
Patented May 17, 1921.
2 SHEETS—SHEET 1.
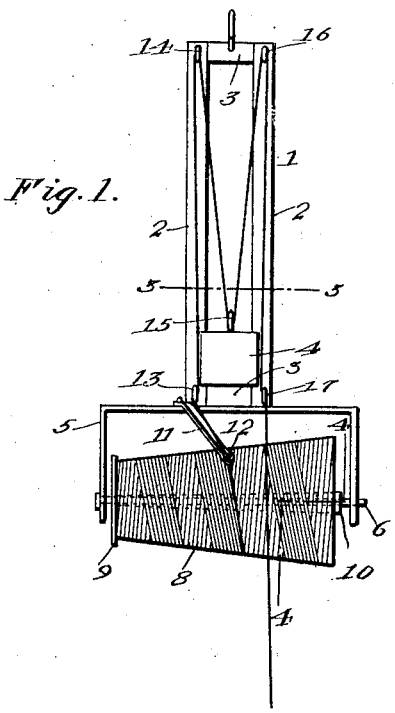
Fig.1.
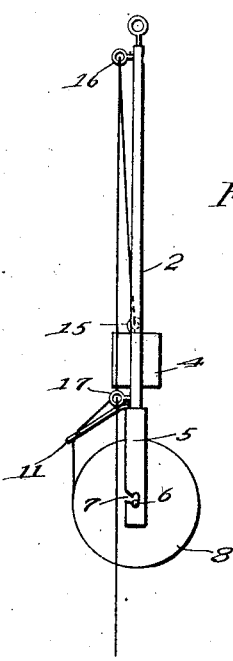
Fig.2.
Fig.4.
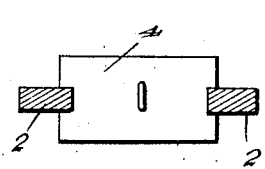
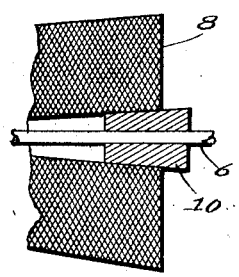
Fig.3.
WITNESS:
R. A. Thomas
INVENTOR.
BY Leo Wright
Victor J. Evans
ATTORNEY.

INVENTOR.
BY Leo Wright
Victor J. Evans
ATTORNEY.

UNITED STATES PATENT OFFICE.

LEO WRIGHT, OF ST. CATHARINES, ONTARIO, CANADA.

TWINE-HOLDER.

1,378,752.
Specification of Letters Patent.
Patented May 17, 1921.

Application filed July 29, 1919, Serial No. 314,004. Renewed April 7, 1921. Serial No. 459,414.

*To all whom it may concern:*

Be it known that I, LEO WRIGHT, a subject of the King of Great Britain, residing at St. Catharines, in the Province of Ontario and Dominion of Canada, have invented new and useful Improvements in Twine-Holders, of which the following is a specification.

This invention relates to improvements in twine holders, and the principal object of the invention is to provide means for holding the loose end of the twine in a position above the counter, out of the way but where it may be easily seized by the clerk when a bundle is to be wrapped.

Another object of the invention is to provide a simple and inexpensive holder for the ball of twine with guiding means for preventing the twine from being twisted or tangled.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention;

Fig. 2 is a view taken at a quarter turn from Fig. 1;

Fig. 3 is a cross section on line 3—3 of Fig. 1;

Fig. 4 is a section on line 4—4 of Fig. 1.

Figure 5:
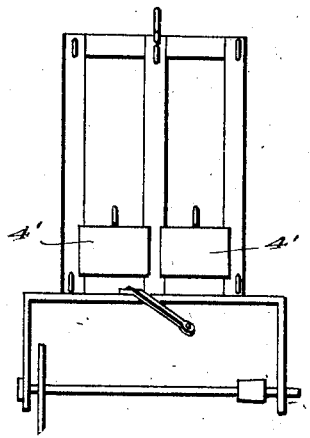
Figs. 5, 6, 7 and 8 are views of modifications.

In these views 1 indicates the frame composed of two upright pieces 2 connected together by the cross pieces 3. The upright pieces form a guide for a vertically-movable weight 4. A bracket 5 is connected with the bottom of the frame and a shaft 6 is journaled in said bracket. One end of the shaft passes through a hole formed in the bracket and its other end engages a slot 7 formed in the bracket so that the shaft may be removed from the bracket whenever desired. The shaft is adapted to support the cone of twine 8 by being passed through the center thereof. The shaft carries a disk 9 which forms a stop for the small end of the cone and also carries a small cone-shaped piece of wood 10 which is adjustably mounted on the shaft and which is adapted to engage the walls of the opening in the cone at the large end of the cone. In this way the cone is rotatably supported in the bracket. An arm 11 is pivotally mounted on the bracket adjacent the base of the frame, and the outer end of the arm is provided with an eye 12 through which the twine is threaded. After leaving the arm the twine passes through an eyelet 13 at the bottom of the frame, up along one side of the frame to an eyelet 14 at the upper end of the frame, then downwardly through an eyelet 15 on the weight and then upwardly again through an eyelet 16 at the upper and of the frame then downwardly through an eyelet 17 at the lower end of the frame, to a position above the counter.

The device is suspended by any suitable means above the counter or adjacent to the counter so that the end of the twine will hang above the counter. When a bundle is to be wrapped the clerk seizes the end of the twine and pulls on the same thus lifting the weight and causing the cone to rotate so as to unwrap the twine. As soon as the twine is broken or cut from the wrapped bundle, the weight will descend thus lifting the end of the twine to a position above the counter so that it will be out of the way but in a position where it can be easily seized by the clerk when a new bundle is to be wrapped.

In the modification shown in Fig. 5, I use two weights 4' instead of the single weight. By this means it is not necessary to make the device of as great a length as shown in the first form.

Figure 6:
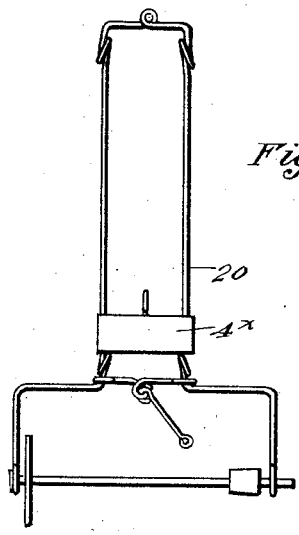

In the modification shown in Fig. 6 the frame of the device is formed of wire as shown at 20 and the weight $4^x$ slides on the upright portions of this wire frame. The frame carrying the double weights may also be made of wire if desired.

Figure 7:
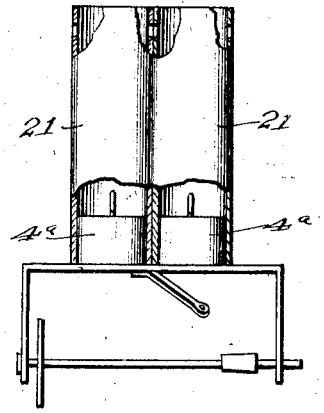

In the modification shown in Fig. 7 the weight supporting members 21 are made of tubes in which the weights $4^a$ are slidably arranged. These tubes are provided with openings through which the twine is threaded. In other respects the device is similar to the first form.

Figure 8:
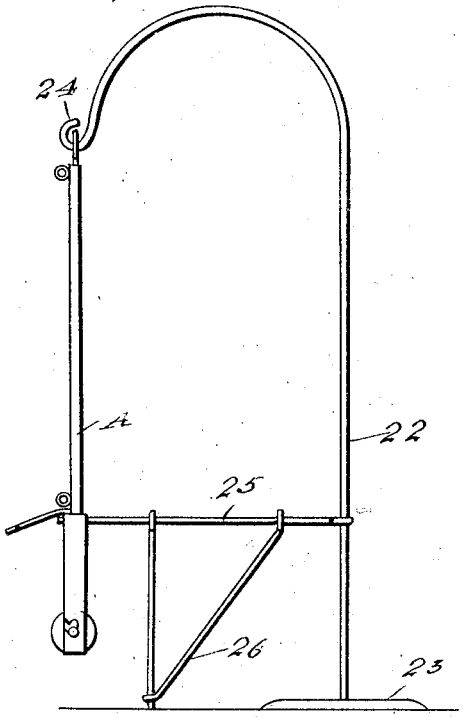

In the modification shown in Fig. 8 I provide means for supporting the holder on the counter, such means consisting of a rod 22 having a stand 23 secured to its lower end and this stand may be secured to the counter. The upper end of the rod is curved and provided with a hook 24 to receive the holding hook of the holder, shown at A. The rod is provided with an arm 25 for supporting the lower part of the holder and the arm is provided with supporting legs 26.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame, a bracket at the lower end of said frame having downwardly parallel portions, a shaft rotatably mounted in said portions and adapted to receive a ball of twine, an outwardly extending arm at the upper part of the bracket having an eye therein through which the twine passes, a weight slidably mounted in the frame and guiding means on the frame and weight for the twine after it leaves the eye.

2. A device of the class described comprising a frame, a bracket at the lower end of said frame having a pair of downwardly extending parallel portions, a shaft rotatably mounted in said portions and adapted to receive a ball of twine, an outwardly extending arm on the upper part of the bracket having an eye therein for receiving the twine, a pair of weights slidably mounted in the frame and eyes on the frame and weights through which the twine is threaded after leaving the eye in the arm.

3. A device of the class described comprising a frame, a bracket at the lower end thereof having downwardly depending portions, a horizontal shaft journaled in said portions and adapted to receive a ball of twine, a weight slidably mounted in said frame, eyes on the frame and weight through which the twine is threaded, an eye on the top of the frame, an upright member, means including a base for holding the same in upright position and a hook on said member for engaging the eye on the top of said frame.

In testimony whereof I affix my signature.

LEO WRIGHT.